United States Patent [19]

Harrison et al.

[11] Patent Number: 4,986,113
[45] Date of Patent: Jan. 22, 1991

[54] LIQUID TANK LEAKAGE DETECTION SYSTEM

[75] Inventors: John M. Harrison; Hubert L. Marshburn, both of Fountain Valley, Calif.; Ron Stout, deceased, late of Bedford, Ind., by Sondra J. Stout, Administrator

[73] Assignee: Computerized Tank Testing, Inc., Fountain Valley, Calif.

[21] Appl. No.: 408,736

[22] Filed: Sep. 18, 1989

[51] Int. Cl.[5] .......................... G01M 3/32; G01F 23/32
[52] U.S. Cl. .......................... 73/49.2; 73/309
[58] Field of Search ............... 73/49.2, 309, 313, 296, 73/453

[56] References Cited

U.S. PATENT DOCUMENTS

| | | | |
|---|---|---|---|
| 2,460,503 | 2/1949 | Howe | 73/453 |
| 3,580,055 | 5/1971 | White | 73/49.2 |
| 4,813,275 | 3/1989 | Castor | 73/49.2 |

FOREIGN PATENT DOCUMENTS

| | | | |
|---|---|---|---|
| 1918281 | 11/1969 | Fed. Rep. of Germany | 73/309 |
| 1019561 | 10/1952 | France | 73/309 |
| 2043902 | 10/1980 | United Kingdom | 73/309 |

Primary Examiner—John Chapman
Assistant Examiner—Joseph W. Roskos
Attorney, Agent, or Firm—Roy A. Ekstrand

[57] ABSTRACT

A liquid tank leakage detection system includes a standpipe and associated measuring pipe together with a sealing connection to the filler pipe of a liquid tank system. A liquid level detector used in cooperation with the measuring pipe includes a float coupled to a measuring beam having one end fixed and the other end coupled to the float. Level changes within the liquid system produce position changes of the float which in turn causes bending or flexing of the beam. A bridge detecting circuit including strain gauges coupled to the flexing beam is operative to provide an output signal indicative of the extent of liquid level changes. A thermocouple is positioned within the liquid tank to provide a temperature compensating signal for use by the measurement system.

13 Claims, 4 Drawing Sheets

LIQUID TANK LEAKAGE DETECTION SYSTEM

FIELD OF THE INVENTION

This invention relates generally to underground liquid storage systems and particularly to devices for leakage detection therein.

BACKGROUND OF THE INVENTION

Because of the extended commercial use of a great number of liquid substances in both commercial and private enterprise, a large variety of liquid storage systems have been developed and placed throughout the earth. While many systems include storage tanks which are erected in above ground locations, frequently the maximum use of land space as well as safety and economic considerations result in the placement of liquid storage tanks and support structures such as connecting pipes, pumps, and the like below ground. In many instances, the entire liquid storage system is buried a substantial distance beneath the earth surface and access thereto is limited to the substantial effort and inconvenience of excavating the entire site to expose the system. One of the most commonly seen underground liquid storage facilities is found in great number throughout industrialized nations in the form of a gasoline filling station or service station. In such systems, one or more storage tanks are buried in the ground together with appropriate connecting pipes and pumping apparatus to supply motor fuel to one or more ground level dispensing devices. Most typically, each underground tank includes a vertical filler pipe extending to the surface for periodic replenishment of the stored fluid.

In an idealized circumstance, the underground liquid storage systems would be fabricated, sealed, placed on site and covered over with earth. Thereafter, in such an idealized situation, no further access to such underground facilities would be required. Unfortunately, however, buried liquid storage systems are subjected to substantial degradation from corrosion of materials, physical damage due to shifting earth structure surrounding and supporting the system and the general deterioration of sealing apparatus and "wear and tear". Thus such underground liquid storage facilities are virtually destined to leak eventually and provide an undesired leakage flow of their contained liquid into the surrounding soil.

While the loss of liquid to the surrounding soil due to leakage is of some economic concern to system owners and operators, the major concern caused by such leakage arises due to the great variety of potentially harmful and toxic substances typically stored in such underground systems. Because liquid leaking into the surrounding soil of a subsurface storage system eventually contaminates the surrounding soil and usually find its way to the nearby underground water supplies, the environmental impact of such leakage is extremely serious.

The environmental and safety concerns created in relation to leakage of such underground liquid storage systems has prompted various controlling agencies to require the periodic testing of such systems the difficulty arises in implementing such testing standards since the detection of such leakage is often an extremely difficult process. One of the most common methods used to detect leakage in underground systems involves the process of attaching a vertical standpipe or riser to the filler pipe orifice of the system and thereafter sealing the standpipe to the orifice. Next, the system is filled completely with liquid and the other discharge connections and pumps are purged of vapor and sealed. Thereafter, the standpipe is filled to a level sufficient to permit the measurement of its liquid level within the standpipe. The measurement then comprises observation and measurement of the changes in liquid level over time. Simply stated, a decrease in liquid level over time signals the existence of a leak within the system. While such methods would seem to be relatively simple and straight forward, they tend to be extremely inaccurate particularly in attempting to detect small leakage. Since the detection of small leakage requires an extended fluid level measurement time, other events and processes within the system detract from the measurement accuracy. For example, the storage tanks themselves over time are subjected to temperature variation and expand or contract changing the system volume. A similar effect occurs within the liquid itself which during temperature changes also expands or contracts providing a second source of erroneous volume change. As a result, the above-described method falls far short of providing the accuracy required to meet the various regulations and rules provided for leakage testing by various agencies.

There arises, therefore, a need in the art for a more accurate improved method of leakage testing for liquid storage systems which maintains its accuracy and reliability in the face of temperature changes and other detracting influences.

SUMMARY OF THE INVENTION

Accordingly, it is a general object of the present invention to provide an improved liquid tank leakage detection system. It is a more particular object of the present invention to provide an improved liquid tank leakage detection system which accurately measures the changes of liquid within the system. It is a still more particular object of the present invention to provide an improved liquid tank leakage detection system which avoids inaccuracies and false indications due to temperature variation within the system.

In accordance with the present invention, there is provided for use in leakage within a liquid tank having a filler pipe, a leakage detection system comprises: a standpipe having an elongated body defining a first open end and a second closed end and a spout extending therefrom; coupling means for sealingly coupling the closed end of the standpipe to the filler pipe of the tank such that a quantity of liquid may be introduced into the standpipe filling the filler pipe, the coupling means and a portion of the standpipe to establish a liquid level therein a float configured to floated upon the liquid; a sensing beam having a fixed end and a free end; beam support means coupled to the fixed end of the sensing beam holding it stationary; strain measuring means operatively coupled to the sensing beam responsive to strain or bending thereof; and float coupling means coupling the float to the free end of the sensing beam such that movement of the float causes strain or bending of the sensing beam.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
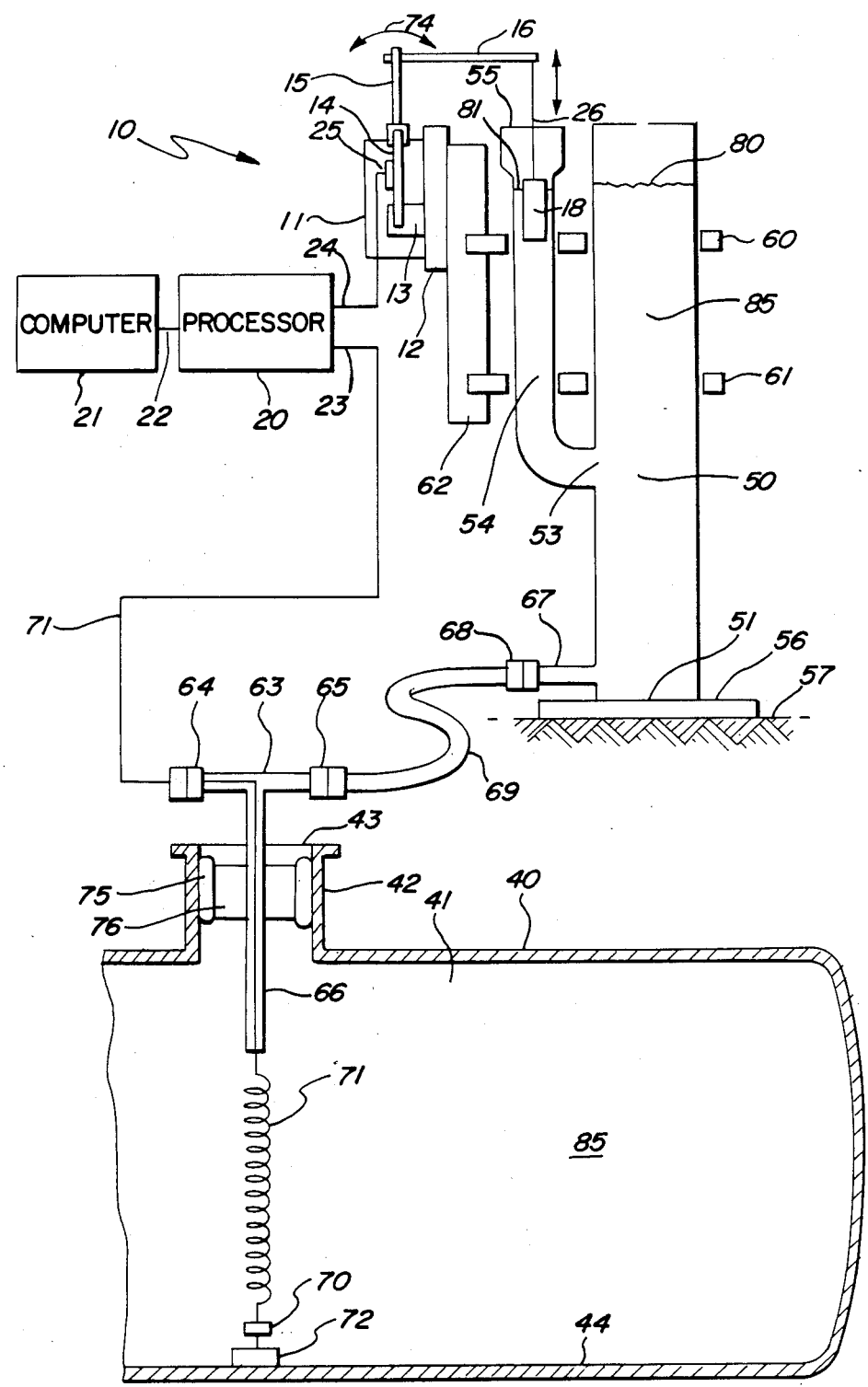
FIG. 1 sets forth a schematic drawing of the present invention liquid tank detection system.

FIG. 1 sets forth a schematic view of the present invention liquid tank leakage detection system generally referenced by numeral 10. A detector 11 includes an insulative base 12 and a rigid beam support 13. Detector 11 further includes a flexible beam 14 securely fixed at one end to beam support 13 and free at the other end. The free end of beam 14 is coupled to an arm 15 which in turn is coupled to a perpendicular arm 16. A plurality of strain gauges 25 are operatively coupled to beam 14 and include a connection 24 which is coupled to a processor unit 20. A case 17 encloses detector 11 and includes an aperture through which arm 15 extends. A computer 21 constructed in accordance with conventional fabrication techniques is operatively coupled to processor 20 by a data link 22. In accordance with the invention, computer 21 may be located at the same measurement site with detector 11 or may be remote therefrom in which case data link may include any of the presently used computer interfaces to couple processor 20 to computer 21.

A liquid storage tank 40 constructed in accordance with conventional liquid storage tank fabrication techniques defines an interior reservoir 41 having a bottom 44 and a vertical filler pipe 42. In further accordance with conventional fabrication techniques, filler pipe 42 terminates in an upwardly facing A quantity of liquid generally referenced by numeral 85 is supported within tank 40 A standpipe 50 having a generally cylindrical cross section and defining an open top end 52 open to atmospheric pressure and a closed bottom end 51 is received within filler pipe 42 via orifice 43. Standpipe 50 further defines an outwardly extending spout 67 near end 51. A T-shaped member 68 defines an electrical connector 64, a fluid coupler 65 and a downwardly extending pipe 66. An inflatable seal 75 and a seal support 76 are interposed between the exterior of pipe 66 and the interior of filler pipe 42 to provide a liquid tight seal therebetween. Standpipe 50 further includes a junction 53 and an upwardly extending measuring pipe 54. Junction 53 permits measuring pipe 54 to be operatively coupled to the interior of standpipe 50. A pair of attachments 60 and 61 secure standpipe 50 and measuring pipe 54 to a vertical support bracket 62. Support bracket 62 in turn includes a conventional fastening attachment to insulated base 12 of detector 11. In accordance with the operation of the present invention system described below in greater detail, an additional quantity of liquid 80 is poured into top end 52 of standpipe 50 causing the liquid level to fill and exceed filler pipe 42 and fill substantially all of standpipe 50 and measuring pipe 54 to reach liquid level 80 within standpipe 50 and liquid level 81 within measuring pipe 54.

Because of the communication between measuring pipe 54 and standpipe 50 provided by junction 53 and the fact that top ends 55 and 52 of measuring pipe 54 and standpipe 50 respectively are open to atmospheric pressure, levels 81 and 80 are equal.

A float 18 selected to float within the liquid is floated within measuring pipe 54 and coupled to arm 16 by a float line 26. A thermocouple line 71 comprising a support line and a plurality of electrical connecting lines is supported by means not shown above top end 52 and extends downwardly to a weight 72 which rests at or near bottom 44 of tank 40. A thermocouple sensing element 70 is supported by line 71 and should be understood to include appropriate electrical connections via line 71 to connection 23 of processor 20. A fluid coupling line 69 is coupled by connectors 65 and 68 between T-member 63 and spout 67. Thus, standpipe 50 and the interior 41 of tank 40 are coupled via spout 67, connectors 68 and 65, line 69 and T-member 63.

In operation, standpipe 50 is placed above the level of tank 40 and its associated piping (not shown) and is supported on a convenient ground surface 57 by base 56. T-member 68 is placed within filler pipe 41 as described above and seal 75 is operated to produce a liquid tight seal therebetween. Thereafter, an additional quantity of liquid is poured into standpipe 50 causing tank 40, filler pipe 42, T-member 63, line 69, standpipe 50, and measuring pipe 54 to be filled to levels 80 and 81 respectively. Once the liquid levels have been raised within the system, float 18 is supported within measuring pipe 54 by its buoyancy within the liquid therein. Processor 20 then undergoes certain initialization and calibration functions which provide the starting or reference point for system measurement. Concurrently, the initial temperature measured by thermocouple unit 70 is also documented by processor 20 to provide the starting value for use in the measuring operation. Following initialization, changes in liquid level 81 produce corresponding changes in the position of float 18. Changes of position of float 18 in turn cause movement of line 26 in the directions indicated by arrows 73 which in turn causes a rotational force upon arm 15 in the direction indicated by arrows 74. The rotational force upon arm 15 in turn subjects beam 14 to a corresponding bending stress. The flexibility of beam 14 permits beam 14 to bend in response to the forces applied by arm 15 due to the secure attachment of beam support 13. The bending or strain caused within beam 14 by movement of float 18 is detected by strain gauges 26. The operation of strain gauges 25, processor 20 and computer 21 are set forth below in greater detail. However, suffice it to note here that in accordance with conventional strain gauge fabrication techniques, strain gauges 25 respond to the strain or bending in beam 14 caused by motion of float 18 to produce corresponding changes in their electrical resistance. The change in electrical resistance of strain gauges 25 is detected by processor 20 and converted to a corresponding sensing signal.

Concurrently, the temperature reading provided by sensing element 70 on thermocouple line 71 is received by processor 20 and provide temperature information which permits processor 20 to compensate for the liquid volume changes occurring within liquid 85 as a result of temperature changes within the liquid. The information coupled to processor 20 both as to temperature and strain gauge resistive characteristics are processed to provide suitable input data signals for computer 21. Computer 21 processes the input signals and provides information indicative of the presence and degree of leakages, if any, within tank 40.

In accordance with an important aspect of the present invention, detector 11 responds to extremely slight variations in liquid level 81 and ia therefore able to detect leakage within a much shorter time than the systems used heretofore. Such systems used heretofore typically required periods of time extending for an hour or more. In contrast, the present invention system obtains accurate leakage measurement within several minutes. In the position shown in FIG. 1, it should be noted that detector 11 is supported by support bracket 62 such that beam 14 and arm 15 extend vertically. Arm 16 is selected to provide the minimum weight and thus the vertical orientation of beam 14 and arm 15 reduce the strain upon beam 14 caused by the combined weight of beam 14 and arm 15. As set forth below in FIG. 4, an alternate embodiment of the present invention provides a detector orientation in which beam 14 and arm 15 extend horizontally and arm 16 is unnecessary because of direct coupling between arm 15 and float line 26.

Figure 2:
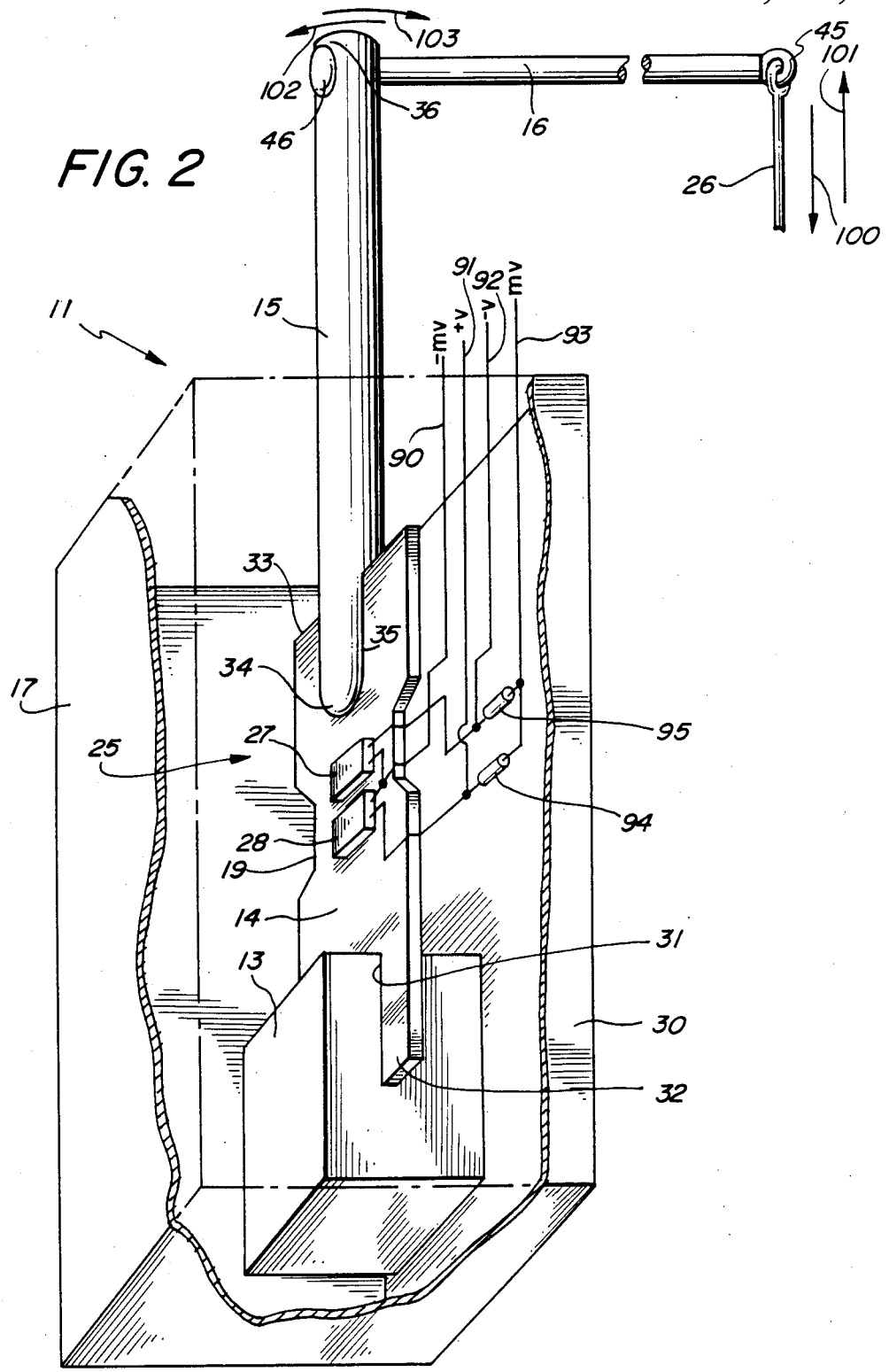
FIG. 2 sets forth a perspective view of the measurement unit of the present invention liquid tank leakage detection system.

FIG. 2 sets forth a perspective view of detector 11. Detector 11 include a chassis 30 supporting a rigid beam support 13. Beam support 18 defines a transverse slot 31. A generally planar beam 14 defines a fixed end 32 received within slot 31 of beam support 13. In accordance with conventional fabrication techniques, beam support 13 firmly and securely maintains end 32 of beam 14 in a fixed position vertically orienting beam 14. Beam 14 further defines a narrowed portion 19 and a movable end 33. An arm 15 formed of a generally cylindrical cross section defines an end 34 having a slot 35 there in and an end 36. Slot 35 receives end 33 of beam 14 in a secure attachment and may be affixed thereto by conventional fabrication techniques such as fasteners or welding or solder junctions. An arm 16 defines an attachment 46 securing arm 16 to end 86 of arm 15 and an eyelet member 45. A float line 26 is secured to float 18 (see FIG. 1) and to eyelet 45 of arm 16.

Strain gauges 25 comprise a pair of individual strain gauge elements 27 and 28 operatively secured to narrow portion 19 of beam 14. A pair of resistors 94 and 95 are supported by chassis 30 and are electrically coupled to strain gauge elements 27 and 28. The electrical couplings between resistors 94 and 95 and strain gauge elements 27 and 28 is set forth below in FIG. 3 in greater detail. Suffice it to note here, however, that strain gauge elements 27 and 28 and resistors 94 and 95 are interconnected to form a conventional resistive bridge circuit. Connections 91 and 92 are coupled to sources of power supply operating voltage while connections 90 and 93 are coupled to the sensing nodes of the bridge circuit thus formed. As a result and as is set forth below in greater detail, the flexing of beam 14 caused by changes in position of float 18 (see in FIG. 1) produce changes in the resistance of strain gauge elements 27 and 28 which in turn produces changes in the voltages detected at electrical connections 90 and 93. Thus with simultaneous reference to FIGS. 1 and 2, changes in liquid level 81 which result in drawing float 18 downwardly in the direction of arrow 100 cause a clockwise motion of arm 16 and arm 15 in the direction indicated by arrow 103 which in turn produces a bending of narrow portion 19 of beam 14 in the same direction. This bending or strain of beam 14 is detected by strain gauge elements 27 and 28 and indicative arrow signals are produced at connections 90 and 93 Conversely, changes in liquid level 81 which move float 18 upwardly in the direction of arrow 101 cause rotational motion of arms 16 and 15 in the direction indicated by arrow 102 which in turn flexes beam 14 in the direction of arrow 102 producing resistive changes in strain gauge elements 27 and 28.

It will be apparent to those skilled in the art that the capability of strain gauge elements 27 and 28 to detect very small strain or flexing of beam 14 permits detector 11 to respond to exceedingly small variations in liquid level 81. Thus the present invention liquid tank leakage detection system permits detection of system leaks without the need to extend the testing time until substantial liquid level changes have been caused. Thus the system responds quickly and, for the most part, the testing procedure is completed before substantial temperature changes have occurred which greatly reduces the influence of temperature changes upon the test results.

Figure 3:
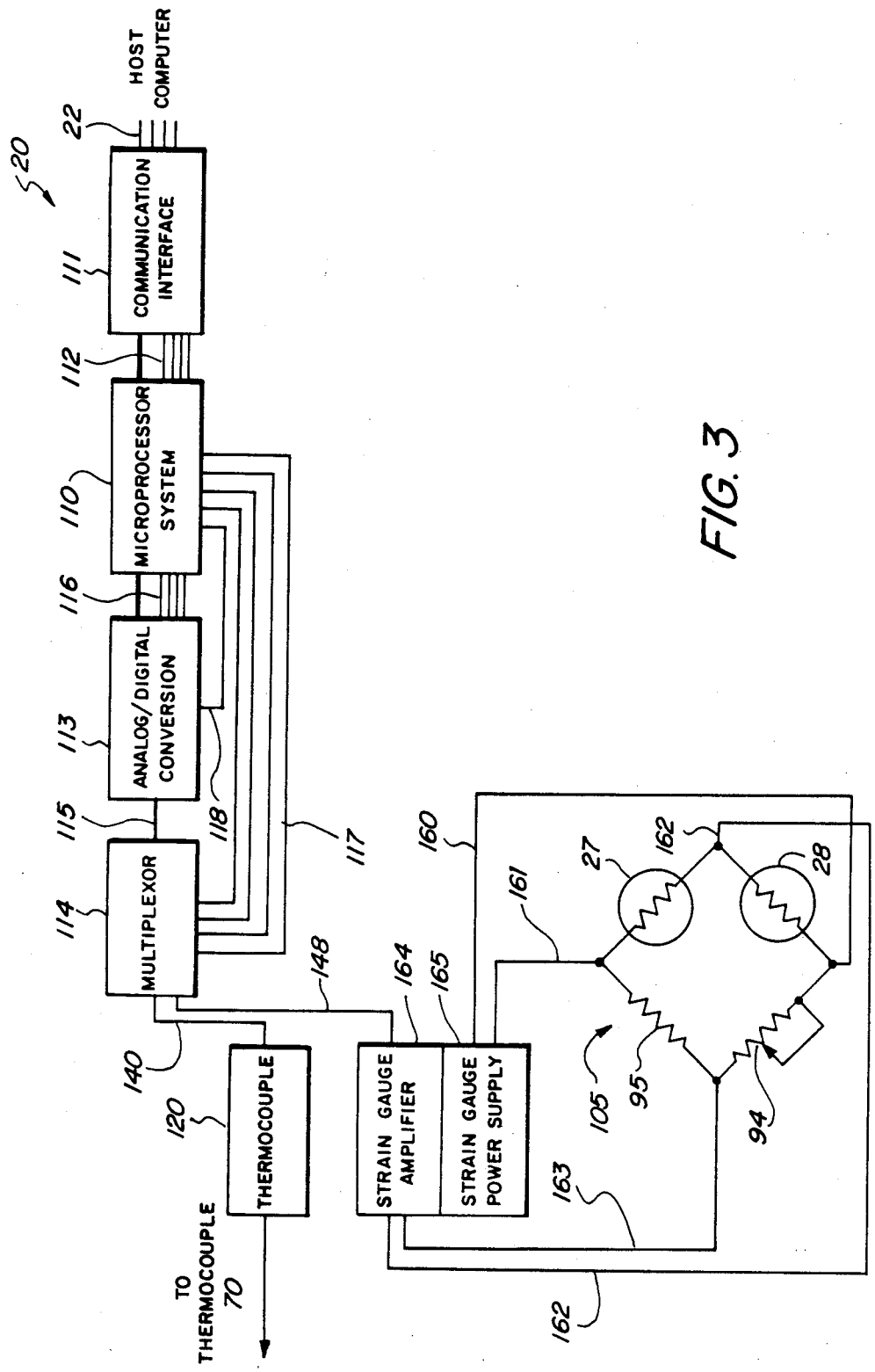
FIG. 3 sets forth a block diagram of the present invention liquid tank leakage detection system.

FIG. 3 sets forth detector 11 and processor 20 in greater detail. A microprocessor 110 constructed in accordance with conventional microprocessor fabrication techniques includes an internal memory (not shown) having a stored instruction set therein. A communications interface 111 is coupled to microprocessor system 110 by a data line 112 and to computer 21 (seen in FIG. 1) by a data link 22. As mentioned above, computer 21 may alternatively be located on site with processor 20 and detector 11 or be remotely located and coupled to processor 20 by a remote data link system. In further alternative, data link 22 may be utilized to couple both to a local or on-site computer and to a remotely located computer without departing from the spirit and scope of the present invention. An analog to digital converter 113 constructed in accordance with conventional analog to digital conversion techniques is coupled to microprocessor 110 by a data link 116 and by a second coupling 118. Analog to digital converter 113 includes conventional circuitry for converting an input analog signal to a digitally encoded signal of the type readily processed by microprocessor 110, communications interface 111 and other computing systems such as computer 21. A multiplexor circuit 114 is coupled to analog to digital converter 113 by a coupling 115 and is coupled to microprocessor 110 by a data connection 117. Multiplexor 114 includes multiplexing circuitry for combining and processing a plurality of input analog signals in accordance with a predetermined multiplexing characteristic. In its simplest form, multiplexor 114 provides amplitude weighted algebraically signed portion of the applied input signals to be combined in a single output signal at coupling 115. It will be apparent to those skilled in the art, however, that a number of multiplexing functions may be used by multiplexor 114 to implement the present invention system. A thermocouple amplifier 120 defines an output connection 140 which is coupled to multiplexor 114. A strain gauge signal amplifier 164 has an output connection 148 which is also coupled to the input of multiplexor 114.

A sensing bridge circuit 105 includes strain gauge elements 27 and 28 commonly joined at a connection 162 and a pair of resistors 94 and 95 coupled respectively to strain gauge elements 28 and 27 and commonly joined to a connection 163. Connection 163 is coupled to strain gauge amplifier 164 while connection 162 is coupled to the remaining input of strain gauge amplifier 164 A strain gauge power supply 165 which includes conventional power supply circuitry for providing an extremely stable temperature insensitive constant voltage is coupled to the junction of resistor 95 and strain gauge element 27 by a connection 161 and to the junction of strain gauge element 28 and resistor 94 by a connection 160. For purposes of convenience, resistor 94 is shown adjustable and is utilized to balance sensing bridge 105. It will be recognized that in the alternative sensing bridge 105 may be balanced without an adjustable resistor in place of resistor 94 if extremely precise and carefully selected components are utilized.

In operation and with temporary reference to FIG. 1 in conjunction with FIG. 3, the motions of float 18 in response to changes in liquid level 81 produce the above-described bending and flexing of beam 14. This flexing in turn is sensed by strain gauge elements 27 and 28 which, as mentioned above, undergo resistive changes in sensing such bending or flexing of beam 14. With sensing bridge 105 initially balanced by resistor 94 and prior to any change in liquid level 81, the voltage appearing at the input of strain gauge amplifier 164 remains constant and the differential therebetween remains equal to zero. Once float 18 moves and beam 14 is caused to bend or flex, the resistance of strain gauge elements 27 and 28 changes which in turn causes sensing bridge 105 to become unbalanced. The unbalance of bridge 105 in turn causes a net differential voltage to be produced at connections 162 and 163. This differential voltage is amplified by strain gauge amplifier 164 to produce an output signal at connection 148 having sufficient signal strength to be utilized by the remainder of processor 20. In short, the signal produced at output 148 of strain gauge amplifier 164 is directly indicative of motions of fluid level 81 and represents one input for leakage measurement. Concurrently, during the above-described measurements, the output signal of thermocouple 70 within liquid 85 produces an output signal which is coupled to thermocouple amplifier 120. Amplifier 120 strengthens the input thermocouple signal to sufficient voltage and power levels to be usable by the remainder of processor 20. Thus the output signal of thermocouple amplifier 120 forms a temperature indicative signal which is utilized by processor 20 to detect temperature changes and compensate therefor. The input signals of thermocouple amplifier 120 and strain gauge amplifier 164 are combined or multiplexed by the operation of multiplexor 114 under the control of processor 110 to produce an output signal 115. In essence, the output signal of multiplexor 114 represents the strain gauge signal amplified in power and adjusted in accordance with temperature variations occurring during the measurement process. It should be noted that the input signal to multiplexor 114 is an analog signal and thus output signal 115 is also an analog signal. That is to say, output signal 115 represents a voltage which changes in magnitude in response to changes in liquid level 81 (seen in FIG. 1). Analog to digital converter 113 converts the applied input signal from multiplexor 114 to a digitally encoded signal which is processed in digital electronic fashion by microprocessor 110. The output of microprocessor 110 comprises a digitally encoded version of the output signal of multiplexor 114 configured to processing by communications interface 111. Communications interface 111 in turn includes conventional circuitry for transmitting the digitally encoded signal from microprocessor 110 via data link 112. The output digitally encoded signal on data link 22 is in turn used by computer 21 to produce the appropriate display and readouts of fluid level changes within the system.

Figure 4:
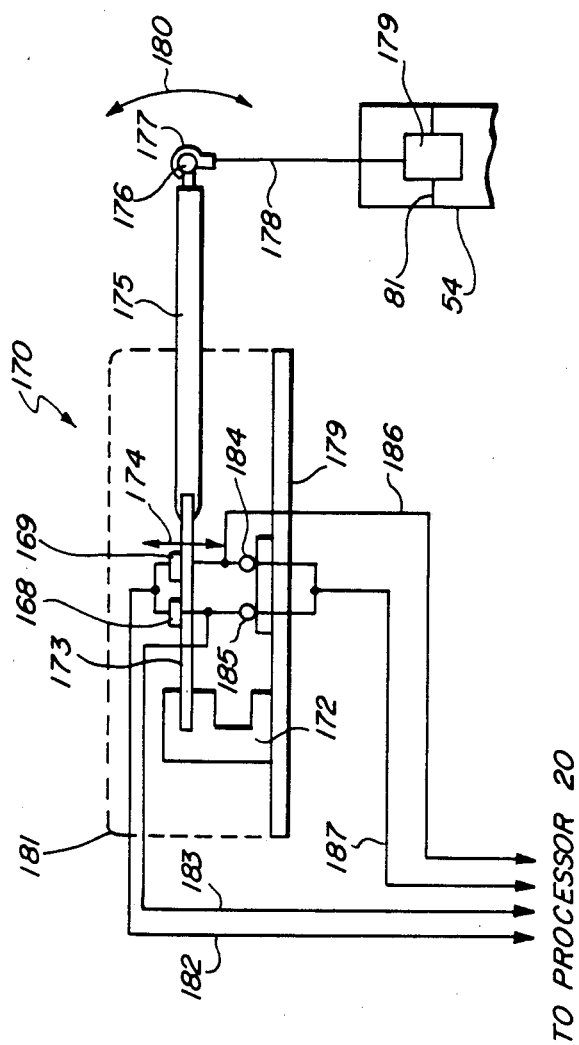
FIG. 4 forth an alternate embodiment of the present invention liquid tank leakage detection system.

FIG. 4 sets forth an alternate embodiment of the detector portion of the present invention system generally referenced by numeral 170. It should be understood that detector 170 apart from being oriented in the horizontal plane is interconnected and operative in the same manner as detector 11 set forth above. Thus detector 170 includes a rigid base 171 together with support means (not shown) for supporting detector 70 in association with measuring pipe 54. Detector 170 further includes a beam support 172 and a flexible beam 173. Beam 173 has one end firmly secured within beam support 172 and the remaining end secured to a horizontal arm 175. Arm 175 terminates at its other end in a spherical ball 176. A float line 178 includes a coupling 177 coupled to ball 176 and supports a float 179. Float 179 is received within measuring pipe 54 in the manner indicated above. A pair of strain gauge elements 168 and 169 are supported upon and operatively coupled to beam 173. A pair of resistors 184 and 185 are supported upon chassis 171. A plurality of electrical connections 182, 183, 186 and 187 provide appropriate interconnections to strain gauge elements 168 and 169 and resistors 184 and 185 to complete the above-described bridge circuit shown in FIG. 3.

Thus in all respects, detector 170 is constructed in general accordance and similarity to detector 11 with the exception of the horizontal positioning of beam 173 and arm 175. Accordingly, motions of float 179 produce corresponding motions of arm 175 in the directions indicated by arrows 180 which in turn cause beam 173 to be bent in the directions indicated by arrows 174. The bending of beam 173 produces the above-described resistance changes in strain gauge elements 168 and 169 which in turn produces the output signals coupled to processor 20 described above. Thus detector 170 provides an alternative for detector 11 in FIG. 1 in selected applications where a horizontal orientation of the deflecting beam is desired.

What has been shown is an extremely precise, accurate and easy to use system for detecting liquid tank leakage which accurately compensates for temperature changes within the liquid. The system shown is operative in a significantly reduced measuring time interval and functions in response to extremely small changes in liquid level.

It will be apparent to those skilled in the art that while it has been found advantageous to utilize measuring pipe 54 in communication with standpipe 50, in certain applications the present invention system may be utilized by floating float 18 directly within standpipe 50 and eliminating measuring pipe 54 all together. In such case, care must be taken of course to avoid contact between float 18 and thermocouple line 71.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use in detecting leakage within a liquid tank having a filler pipe, a leakage detection system comprising:
   a standpipe having an elongated body defining a first open end and a second closed end, a first internal passage and a spout extending therefrom;
   coupling means for sealingly coupling said first internal passage to the filler pipe of the tank such that a quantity of liquid may be introduced into said standpipe filling the filler pipe, said coupling means and a portion of said standpipe to establish a liquid level therein;

a float configured to float upon the liquid;

a sensing beam having a fixed end and a free end;

beam support means coupled to said fixed end of said sensing beam holding it stationary;

temperature means for measuring the temperature of the liquid within the tank.

strain measuring means operatively coupled to said sensing beam responsive to strain or bending thereof; and float coupling means coupling said float to said free end of said sensing beam such that movement of said float causes strain or bending of said sensing beam said float coupling means including a rigid arm having a first end fixed to said free end of said sensing beam and a second end and a float line coupling said float to said second end of said arm.

2. A leakage detection system as set for in claim 1 wherein said sensing beam and said arm are generally horizontal and said float line is generally vertical.

3. A leakage detection system as set forth in claim 1 wherein said sensing beam is generally vertical and wherein said arm is generally L-shaped having a vertical portion at said first end and a horizontal portion at said second end.

4. A leakage detection system as set forth in claim 1 wherein said strain measuring means include a resistive bridge circuit having:
   a pair of strain gauges operatively coupled to said sensing beam;
   a pair of resistors coupled to said pair of strain gauges to form said resistive bridge circuit;
   a power supply coupled to said resistive bridge circuit; and
   circuit means, coupled to said resistive bridge circuit, responsive to unbalances therein to produce a first output signal indicative of float movement.

5. A leakage detection system as set forth in claim 4 wherein said temperature means produce a second output signal indicative of liquid temperature and wherein said circuit means include multiplexing means for adjusting said first output signal in response to said second output signal.

6. A leakage detection system as set forth in claim 5 wherein said temperature means include a temperature sensor within the tank and wherein said second output signal includes a temperature indicative signal therefrom.

7. For use in determining leakage within a liquid tank having a filler pipe, a leakage detection system comprising:
   a standpipe having an elongated body defining a first open end and a second closed end, a first internal passage and a spout extending therefrom;
   a measuring pipe having a junction in communication with said first internal passage and ah open end and a second passage therebetween;
   coupling means for sealingly coupling said first internal passage to the filler pipe of the tank such that a quantity of liquid may be introduced into said standpipe filling the filler pipe, said coupling means and a portion of said standpipe and said measuring pipe to establish a liquid level within said first and second passages;
   a float configured to float upon the liquid within said second passage;
   a sensing beam having a fixed end and a free end;
   beam support means coupled to said fixed end of said sensing beam holding it stationary:
   strain measuring means operatively coupled to said sensing beam responsive to strain or bending thereof; and float coupling means coupling said float to said free end of said sensing beam such that movement of said float causes strain or bending of said sensing beam.

8. A leakage detection system as set forth in claim 7 further including temperature means for measuring the temperature of the liquid within the tank.

9. A leakage detection system as set forth in claim 8 wherein said float coupling means include:
   a rigid arm having a first end fixed to said free end of said sensing beam and a second end; and
   a float line coupling said float to said second end of said arm.

10. A leakage detection system as set forth in claim 9 wherein said sensing beam and said arm are generally horizontal and said float line is generally vertical.

11. A leakage detection system as set forth in claim 9 wherein said sensing beam is generally vertical and wherein said arm is generally L-shaped having a vertical portion at said first end and a horizontal portion at said second end.

12. A leakage detection system as set forth in claim 9 wherein said strain measuring means include a resistive bridge circuit having:
    a pair of strain gauges operatively coupled to said sensing beam;
    a pair of resistors coupled to said pair of strain gauges to form said resistive bridge circuit;
    a power supply coupled to said resistive bridge circuit; and
    circuit means, coupled to said resistive bridge circuit, responsive to unbalances therein to produce a first output signal indicative of float movement.

13. A leakage detention system as set forth in claim 12 wherein said temperature means produce a second output signal indicative of liquid temperature and wherein said circuit means include multiplexing means for adjusting said first output signal in response to said second output signal.

* * * * *